United States Patent
Li (10) Patent No.: US 7,230,715 B2
(45) Date of Patent: Jun. 12, 2007

(54) ULTRAFAST LASER PULSE SHAPE MEASUREMENT METHOD AND SYSTEM

(75) Inventor: Ming Li, Chelmsford, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 251 days.

(21) Appl. No.: 11/006,109

(22) Filed: Dec. 7, 2004

(65) Prior Publication Data
US 2006/0119855 A1 Jun. 8, 2006

(51) Int. Cl.
*G01B 9/02* (2006.01)
(52) U.S. Cl. ...................................... 356/450
(58) Field of Classification Search ............... 356/450, 356/451, 452
See application file for complete search history.

(56) References Cited
U.S. PATENT DOCUMENTS

| | | | | |
|---|---|---|---|---|
| 5,479,256 A | * | 12/1995 | Tamai et al. ................. | 356/451 |
| 5,530,544 A | * | 6/1996 | Trebino et al. .............. | 356/450 |
| 5,754,292 A | * | 5/1998 | Kane et al. .................. | 356/450 |
| 6,219,142 B1 | * | 4/2001 | Kane ........................... | 356/450 |
| 6,819,428 B2 | * | 11/2004 | Ogawa ......................... | 356/450 |

\* cited by examiner

Primary Examiner—Gregory J. Toatley, Jr.
Assistant Examiner—Michael A. Lyons
(74) Attorney, Agent, or Firm—RatnerPrestia (57) ABSTRACT

A laser pulse shape measuring system to measure the pulse shape of pulses generated by a pulsed laser. Each pulse includes a pulse width and a peak wavelength. The system includes: a beam splitter coupled to the laser to separate each of the pulses into a test pulse and a probe pulse; a pulse width compression means coupled to the beam splitter to compress the pulse width of each probe pulse; a controllable delay means to control a time offset between each test pulse and a corresponding probe pulse; a nonlinear optical medium arranged such that the test beam path and the probe beam path intersect within it to generate wavelength converted pulses corresponding to intersecting pairs of pulses; a detector coupled to the nonlinear optical medium to detect the pulse energies of the wavelength converted pulses; and a processor to determine the pulse shape of the laser pulses.

44 Claims, 5 Drawing Sheets

ULTRAFAST LASER PULSE SHAPE MEASUREMENT METHOD AND SYSTEM

FIELD OF THE INVENTION

The present invention relates generally to methods and systems for measuring the temporal pulse shape of pulses of laser light from ultrafast laser. More particularly these methods and systems may be used to provide simplified measurements of the pulse shapes of pulses of laser light having pulse durations of in the picosecond range.

BACKGROUND OF THE INVENTION

The invention of ultrafast lasers in 1965 led to the desire for new techniques to measure the duration of ultrashort optical pulses. Direct measurement techniques using photodetectors and oscilloscopes are inadequate to temporally resolve the pulses being produced by ultrafast lasers, typically less than 1 ns in duration. An indirect technique with subpicosecond time resolution has been proposed and demonstrated, however. This technique is based on the nonlinear process of second-harmonic generation (SHG). The optical pulse is divided into two beams, which travel different paths before being recombined in a nonlinear crystal, to generate a new second harmonic pulse that is then detected. The second harmonic pulse represents the autocorrelation of the ultrafast pulse at a particular temporal offset. One of the path lengths of the two beams is varied so that the second harmonic pulses may sketch out the autocorrelation function of the ultrafast pulses. The autocorrelation technique for pulse measurement does not provide a way of measuring pulse shape but instead gives correlation functions, which can be used to resolve pulse duration as shown in Equation 1.

$$I_{auto}(\tau) \propto \left| \int_{-\infty}^{\infty} E(t-\tau) \cdot E(t) \, dt \right|^2 \quad (1)$$

Unfortunately, Equation 1 illustrates that the autocorrelation function is always temporally symmetric, even if the laser pulse E(t) has an asymmetric shape. Therefore this approach is not desirable for determining the shape of ultrafast laser pulses.

A Frequency-Resolved-Optical-Gating (FROG) provides a way to solve this problem. An autocorrelation technique as previously described only captures the intensity information of a laser pulse. To fully characterize the pulse, it is desirable to capture phase information as well as intensity information. To solve this problem, a FROG device was proposed to measure the pulse shape. A FROG is also an autocorrelator, but what differentiates a FROG from a typical autocorrelator is that it captures the spectrum of the signal, as opposed to just the intensity for each delay position. The phase information of the pulse is contained in the spectrum. Thus, the pulse shape can be retrieved from the FROG trace.

When measuring a laser pulse shape use this FROG method, it is desirable to have good spectral resolution to ensure that the necessary phase information recorded. A typical femtosecond laser pulse has a wavelength bandwidth of less than 1 nm. Such a bandwidth may be easily resolved with presently available spectrometers, and the FROG technique works well for determining the pulse shape and duration of femtosecond laser pulses. However, FROG techniques do not work as well for picosecond laser pulses. For example, a transform-limited 20 ps laser pulse at 1053 nm has a bandwidth of 0.1 nm, which may be difficult to resolve accurately using a spectrometer.

Another approach that has been proposed to measure the pulse shape of ultrafast pulses is to image the pulses using a streak camera. This method works well for longer pulses, but may have difficulties with obtaining highly precise and accurate pulse shape measurements for pulse widths less that about 1 ns due to jitter in the timing circuitry of the camera. Improvements in these circuits may extend the range of this method, but some jitter is likely to remain.

The present invention provides a method that may be used to accurately measure pulse shapes for optical pulses over a broad range of pulse widths, including picosecond laser pulses that are difficult to measure by other techniques.

SUMMARY OF THE INVENTION

An exemplary embodiment of the present invention is a method for measuring the pulse shape of a first set of substantially similar pulses of laser light. The first set of pulses is generated. Each of these pulses includes a first pulse width, a predetermined pulse period, and a predetermined peak wavelength. A second set of substantially similar pulses that is substantially synchronized with the first set is generated. Each of these pulses includes: a second pulse width less than the first pulse width; and a peak wavelength substantially equal to the predetermined peak wavelength. A controllable time offset is created between the first set of pulses and the second set of pulses that is less than the predetermined pulse period of the first set of pulses. The time offset pairs of pulses are intersected within a nonlinear optical medium to generate a set of wavelength converted pulses. Each of the wavelength converted pulse includes: a converted pulse width substantially equal to the second pulse width; a converted peak wavelength shorter than the predetermined peak wavelength; and a pulse energy based on the pulse shape of the first set of pulses and the controllable time offset between the corresponding intersecting pair of pulses. The pulse energies of the wavelength converted pulses are detected as the controllable time offset between pairs of intersecting pulses is varied and the pulse shape of first set of pulses is determined from these detected pulse energies and the controllable time offsets between corresponding pairs of intersecting pulses.

Another exemplary embodiment of the present invention is a laser pulse shape measuring system to measure the pulse shape of a set of pulses of laser light generated by a pulsed laser. Each pulse of this set of pulses includes a pulse width and a peak wavelength. The laser pulse shape measuring system includes: a beam splitter optically coupled to the pulsed laser to separate each of the set of pulses into a test pulse and a probe pulse; a pulse width compression means optically coupled to the beam splitter to compress the pulse width of each probe pulse to a probe pulse width; a controllable delay means to control a time offset between each test pulse and a corresponding probe pulse; a nonlinear optical medium arranged such that the test beam path and the probe beam path intersect within the nonlinear optical medium to generate wavelength converted pulses corresponding to intersecting pairs of test pulses and probe pulses; a detector optically coupled to the nonlinear optical medium to detect the pulse energies of the wavelength converted pulses; and a processor electrically coupled to the controllable delay means and the detector to determine the pulse shape of the set of pulses generated by the pulsed laser. The controllable delay means is aligned in at least one of the test beam path or the probe beam path. The time offset between each test pulse and the corresponding probe pulse is controlled to be less than a pulse period of the set of pulses. Each wavelength converted pulse includes: a converted pulse width substantially equal to the probe pulse width of the probe pulses; a converted peak wavelength shorter than the peak wavelength of the test pulses; and a pulse energy based on the pulse shape of the plurality of pulses generated by the pulsed laser and the time offsets between the corresponding pairs of intersecting pulses. The processor determines the pulse shape of the set of pulses based on the pulse energies of the wavelength converted pulses and the time offsets between the corresponding pairs of intersecting pulses.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

As described above, a typical autocorrelation technique does not allow the pulse shape to be resolved and a FROG technique works best for shorter duration pulses that have relatively wide wavelength bandwidths. Therefore, a different approach is desirable for laser pulses with pulse widths, durations, in the range of about 100 fs to 1 ns.

The present invention provides such an approach, the use of a cross-correlation technique to measure the pulse shape, and duration. An autocorrelation technique is a correlation of two beams, the electric fields of which are identical or are proportional. One common way to perform an autocorrelation is for one beam to be split into two beams, and the then two beams are recombined with a controllable time offset. Equation (1) shows that the intensity of the autocorrelation is a convolution of the electric field for the first beam, E, with the electric field for the second beam, which is also E. In contrast, a cross-correlation is correlation of two different beams. The cross-correlation function is shown in Equation 2.

$$I_{cross}(\tau) \propto \left| \int_{-\infty}^{\infty} E(t-\tau) \cdot E'(t) dt \right|^2 \quad (2)$$

Notice, the electric field for the first and the second beams are denoted differently than in Equation 1, i.e. as E and E', respectively. Common differences for these two fields can be wavelength, pulse duration, or another parameter. For example, a pulse from a femtosecond (fs) laser may desirably have a duration which is 1/100 of that of a pulse from a picosecond (ps) laser. If the fs laser pulse is used as a sensor to probe different parts of the ps laser pulse the ps laser pulse shape may be resolved with an accuracy of at least the pulse width of the fs laser pulse. As long as E is not proportional to E' at any time, this would be a cross-correlation of the two beams. During this exemplary ps laser pulse shape measurement, the pulse shapes of the two beams are different, which results in a difference between E and E'.

In order for this exemplary cross-correlation technique to work, it is desirable to have a second set of laser pulses which have a significantly shorter duration than the set of pulses to be measured and the two sets of pulses are desirably synchronized with a controllable temporal offset. It is noted that the shorter the pulse width of the second set of pulses relative to the first set of pulses the more closely the cross-correlation function resembles an exact function of the pulse shape of pulses in the first set of pulses.

It is contemplated that the cavity of a probe laser (desirably a fs laser) may be locked such that it pulses synchronously with another ultrafast laser to provide the probe pulses for the exemplary cross-correlation method of the present invention. The synchronization of the probe laser cavity is likely to display some jitter, thus limiting the range of an exemplary cross-correlation system using this second cavity design, similar to the problems of streak cameras described above. Additionally, the probe laser cavity may have a slightly different rep rate than ultrafast laser to be probed, so that in over a number of pulses the two laser cavity may become completely unsynchronized. However, as with the streak camera technique described above, potential reductions in the amount of jitter, or improvements in intercavity synchronization, may extend the range of such an exemplary cross-correlation based laser pulse shape measuring system.

Figure 1:
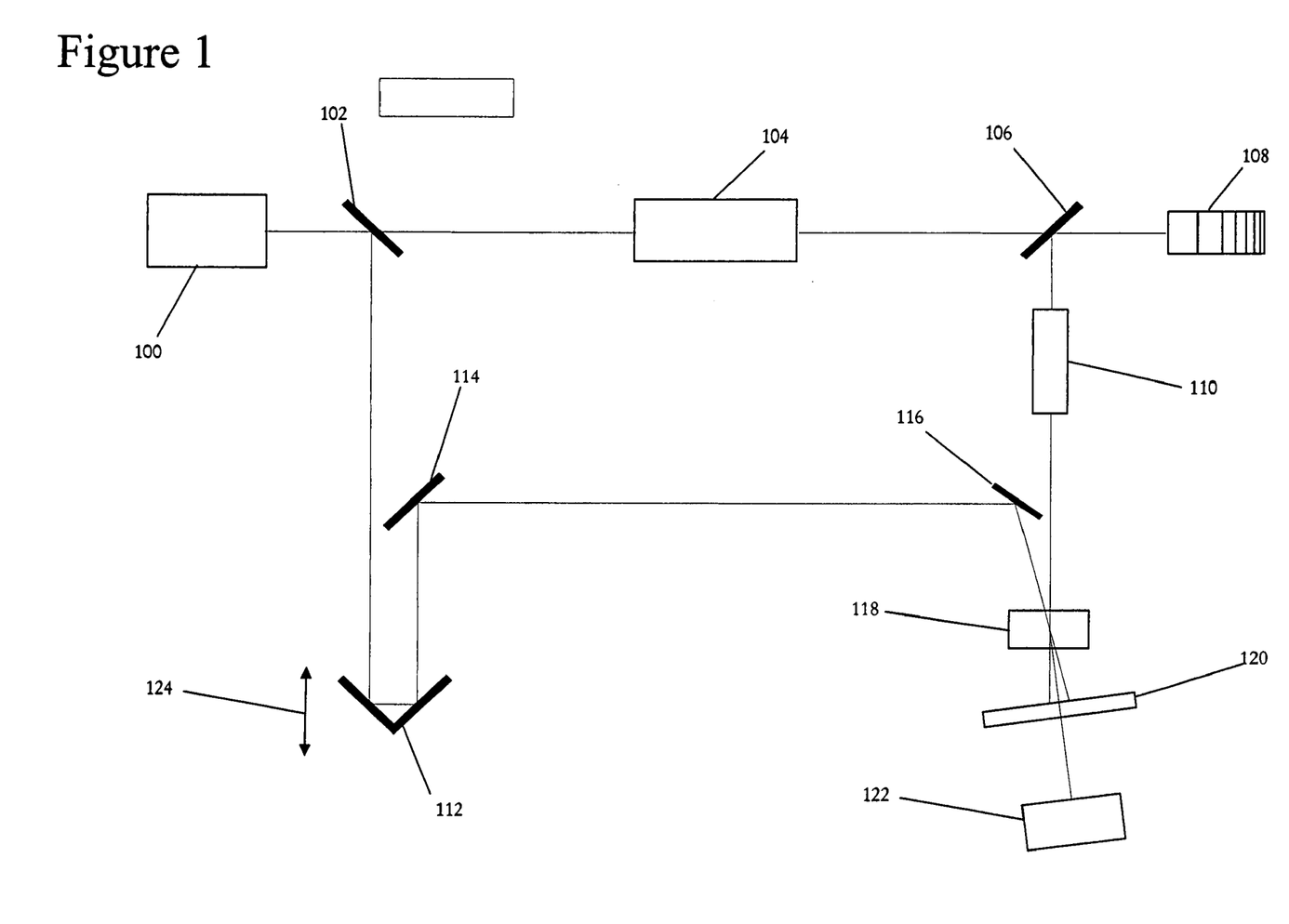
FIG. 1 is a schematic block diagram illustrating an exemplary laser pulse shape measuring system according to the present invention.

FIG. 1 illustrates another exemplary cross-correlation based laser pulse shape measuring system that may overcome the pulse synchronization problem. The probe pulses desirably have the same repetition rate (or period between pulses) and a shorter pulse width, and may have substantially the same peak wavelength, as the pulses of pulsed laser source 100. To generate the probe pulses, which are synchronized with the pulses of pulsed laser source 100, the exemplary system of FIG. 1 uses the original pulses of pulsed laser source 100. Since the probe pulses are generated directly from the pulses of pulsed laser source 100, they are automatically synchronized.

The exemplary system of FIG. 1 includes: pulsed laser source 100; beam splitter 102; pulse width compression means which include self-phase modulation medium 104, beam splitter 106, and dispersion compensator 108; electrooptical cell 110; controllable delay means which include retroreflector 112 and a linear translation stage (not shown); dichroic mirrors 114 and 116; nonlinear optical medium 118; optical filter 120; detector 122; and a processor (not shown) to determine the pulse shape of the pulses generated by pulsed laser source 100.

As noted above, the exemplary cross-correlation techniques of the present invention may be particularly desirable for measuring the pulse shape of laser pulses where the pulse width of each pulse generated by pulsed laser source 100 is longer than about 100 fs and shorter than about 1ns, but this range is not limiting. The only limit on the range of the exemplary system of FIG. 1 is ability of the exemplary pulse width compression means to compress the pulse width of the laser pulses generated by pulsed laser source 100. This ability is constrained by the same issues that relate to the generation of shorter pulse widths in ultrafast lasers, i.e. bandwidth, peak power level, etc.

The peak wavelength of the pulses generated by pulsed laser source 100, and correspondingly the gain medium of pulsed laser source 100, is not limited in the present invention. Different peak wavelengths may affect the choice of materials for the various optical components of the exemplary system. Thus, a particular exemplary cross-correlation based laser pulse shape measuring system based on the design of FIG. 1 may be optimized to a certain wavelength bandwidth, but the design itself is not so limited.

Beam splitter 102 is optically coupled to pulsed laser source 100 to separate each of its pulses into a test pulse and a probe pulse. Although beam splitter 102 is shown as a partially transmissive mirror in FIG. 1, it is noted that other means of splitting the pulses of laser source 100 may be used as well, such as a diffractive optical element or a mask with two holes (and at least one means to redirect a portion of the pulse passing through one of holes). It is desirable for the peak powers of the test pulse and the compressed probe pulse to be similar in magnitude. Therefore, the pulse energy of each test pulse may desirably be greater than or equal to the pulse energy of the corresponding probe pulse, but the desired pulse energies of the split pulses may be affected by the efficiency of the pulse width compression means.

The probe pulses are optically coupled from beam splitter 102 into the pulse width compression means. The exemplary pulse compression technique of the exemplary system of FIG. 1 involves sending high power probe pulse into self-phase modulation medium 104 in which self-phase modulation of the probe pulse takes place, resulting in broadening of the wavelength bandwidth of the probe pulse. Dispersion compensator 108 is then used to compress the bandwidth broadened probe pulse, desirably to nearly its transform-limited pulse width. It is noted that if the original pulses of pulsed laser source 100 are not substantially transform-limited, it may not be necessary to broaden their wavelength bandwidth before using dispersion compensation to compress their pulse width. In this case, self-phase modulation medium 104 may be omitted from the exemplary system.

Self-phase modulation medium 104 may include an optical fiber, a bulk optical dielectric, and/or a substantially transparent liquid. The material of the optical fiber, bulk dielectric, and/or liquid of self-phase modulation medium 104 desirably has a permittivity with a non-zero value for at least one order greater than 1 to induce the desired self-phase modulation.

Dispersion compensator 108 may include any standard dispersion compensation means, such as a fiber dispersion compensator, a chirped volume grating based dispersion compensator, a dispersion compensator formed of a pair of gratings, which may be reduced to one grating if folded by a mirror, a chirped mirror based dispersion compensator, and/or a prism (or a pair of prisms) based dispersion compensator. The exemplary system of FIG. 1 illustrates the use of partially reflecting mirror 106 and chirped volume grating based dispersion compensator 108 to compress the wavelength-broadened probe pulses. A portion of the wavelength-broadened probe pulses pass through partially reflecting mirror 106 and are reflected back with a wavelength dependent delay by chirped grating based dispersion compensator 108. A portion of the remaining probe pulses are then directed by partially reflecting mirror 106 on toward nonlinear optical medium 118. Although relatively simple, this exemplary dispersion compensating technique may have greater losses compared to some other means, such as: replacing partially reflecting mirror 106 with a circulator; using a pair of chirped gratings, prism, and/or mirrors; etc. In specific applications, simplicity, low loss, or the desire to achieve transform-limited compression may affect the choice of a dispersion compensation means.

The exemplary pulse width compression means of FIG. 1 may be used to provide a significant compression of the probe pulse width. The probe pulse width may typically be less than one fiftieth of the original pulse width of the pulses of laser light generated by pulsed laser source 100. Desirably, though, the compression of the probe pulses may be by a factor of more than 100 or even 1000. As noted above, the greater the pulse width compression, the greater the resolution of the pulse shape of the test pulses.

A cross-correlation function represents correlations from scanning one signal relative to another. To allow the probe pulse to be scanned relative to the test pulse, a controllable delay means is used to control the time offset between the arrival of each test pulse and its corresponding probe pulse at nonlinear optical medium 118. A controllable delay may be added to the test pulse, the probe pulse, or both. The amount of time offset between a test pulse and the probe pulse that is used to probe the test pulse is necessarily less than the pulse period of the pulses, but it is noted that this corresponding pair of pulses may not have been split from the same pulse of pulsed laser source 100. This does not present a problem.

FIG. 1 illustrates two exemplary controllable delay means that may be used, singly or in combination, in an exemplary cross-correlation based laser pulse shape measuring system of the present invention. It is also noted that, although one exemplary controllable delay means is aligned in the beam path of the test pulse and the other in the beam path of the probe pulse, these alignments are merely for illustrative purposes. One skilled in the art may understand that these alternative exemplary controllable delay means may be aligned in either beam path.

The test pulses in the exemplary system of FIG. 1 may be controllably delayed using optics, retroreflector 112, mounted on a linear translation stage (not shown). Retroreflector 112 is aligned in the beam path of the test pulses to controllably vary the length of the test beam path as retroreflector 112 is translated parallel to the test pulse beam path by the linear translation stage as illustrated by arrows 124. It is noted that the optics may include reflective, refractive, and/or diffractive optical elements.

The linear translation stage may include one or more of a linear motor driven motion stage; a ball screw driven motion stage; a lead screw driven motion stage; a belt driven motion stage; or a piezoelectric motion stage. The linear translation stage(s) may desirably be computer-controlled motion stage(s). Movements of retroreflector 112 by the linear translation stage(s) result in changes in the length of the test beam path equal to twice the distance moved by retroreflector 112, which cause corresponding delays in the arrival of the test pulses at nonlinear optical medium 118, i.e. a translation of 15 cm in air provides a delay of about 1ns. The desired maximum displacement of the linear translation stage(s) is based on the pulse width of the test pulses and the speed of light. Therefore, it is desirable for the linear translation stage(s) to have a maximum displacement of at least about $1.5 \times 10^8$ m/s times the pulse width of the test pulses to allow scanning of the entire test pulse. Similarly, the positioning accuracy of the linear translation stage(s) affects the accuracy of the pulse shape measurements. Therefore, a positioning accuracy of less than or equal to about $1.5 \times 10^8$ m/s times the pulse width of the probe pulses is desirable, as well. For example, a motion stage with micrometer resolution (such as, a micron resolution motion stage manufactured by Burleigh) may be desirable to achieve a resolution of about 7 fs.

The probe pulses in the exemplary system of FIG. 1 may be controllably delayed using electrooptical cell 110. This exemplary electrooptical cell is adapted to vary its refractive index in response to an electric field across the material of the cell, thereby varying an optical path length of a probe pulse traveling through the electrooptical cell. A number of materials may be used to form electrooptical cell 110, including nematic liquid crystals, bulk electrooptical solids such as $LiNbO_3$, and multilayer dielectric materials with quantum well structures.

As with the mechanical controllable delay means describe above, the desired maximum optical path length change of electrooptical cell 110 is related to the pulse width of the test pulses and the desired accuracy of the resulting optical path length of the pulses is related to the pulse width of the probe pulses. Thus, the maximum path length change generated by electrooptical cell 110 is desirably greater than or equal to about $3.0 \times 10^8$ m/s times the pulse width of the test pulses, and the path length accuracy is desirably less than or equal to about $3.0 \times 10^8$ m/s times the pulse width of the probe pulses.

Once the desired time offset between the test and probe pulses has been achieved the pulses are optically coupled into nonlinear optical medium 118 which is arranged such that in the test beam path and the probe beam path intersect within it to generate a set of wavelength converted pulses corresponding to intersecting pairs of test pulses and probe pulses. Each wavelength converted pulse desirably has a converted pulse width substantially equal to the probe pulse width and a converted peak wavelength shorter than the peak wavelength of the test pulses. Nonlinear optical medium 118 desirably generates the wavelength converted pulses based on nonlinear optical phenomena, such as harmonic generation or degenerate four wave mixing, in which the intensity of the wavelength converted radiation generated at a given time has a dependence related to the product of the test pulse and probe pulse at that time.

Such nonlinear processes may closely approximate a convolution of the two pulses. Controllably varying the time offsets to scan the probe pulses over the test pulses may generate a series of wavelength converted pulses with pulse energies related to the cross-correlation function of the test pulses and the probe pulses. It is noted that the pulse width of the probe pulse is desirably narrow compared to the test pulse. If the probe pulse width is narrow enough relative to the test pulse width, it may be thought of as approximating a delta function. In this case, the pulse energy of the wavelength converted pulses is based largely on the pulse shape of the test pulses (which are desirably the same as the pulse shape of the original pulses generated by pulsed laser source 100) and the time offsets between the corresponding pairs of intersecting pulses. The cross-correlation function is substantially the same as the test pulse shape.

If nonlinear optical medium 118 is a harmonic generating crystal (or a medium for degenerate four wave mixing, in which case the output may have the same wavelength as the input wavelength; or a medium for another nonlinear process), the converted peak wavelength is substantially equal to the peak wavelength of the pulses generated by pulsed laser source 100 divided by the harmonic number, i.e. an integer greater than 1. It is noted that harmonic generation crystals may desirably be optimized to provide phase matching for a particular input fundamental wavelength and harmonic number. Therefore, although it may be possible to broaden the wavelength bandwidth of the probe pulse over a significant range to increase compression of its pulse width, such broadening may undesirably affect harmonic generation in nonlinear optical medium 118.

To measure the pulse energies of the wavelength converted pulse, it is desirable to separate these pulses from any unconverted portions of the test and probe pulses. Optical filter 120 may be aligned between nonlinear optical medium 118 and detector 122 to preferentially pass the wavelength converted pulses and substantially block the test pulses and the probe pulses. Although other filter types may be used, optical filter 120 may desirably be either a dielectric bandpass filter with a pass band centered near the peak wavelength of the wavelength converted pulses, or a dielectric high-pass filter with a cutoff frequency higher the frequencies of the peak wavelengths of the test and probe pulses and lower than the frequency of the peak wavelength of wavelength converted pulses. Alternatively, detector 122 may be a photodetector with a cutoff wavelength shorter than the shortest wavelength of the probe pulses to detect the pulse energy of the wavelength converted pulses.

A processor (not shown) is electrically coupled to the controllable delay means and detector 122. The processor may desirably include pulse shape analysis circuitry or an application specific integrated circuit (ASIC) adapted to determine the pulse shape of the pulses generated by the pulsed laser based on the pulse energies of the wavelength converted pulses detected by detector 122 and the time offsets between the corresponding pairs of intersecting pulses. The processor may also include: temporal offset calculation circuitry, or ASIC, responsive to an optical path length signal from an optical path length sensor in the controllable delay means to calculate the time offsets between the corresponding pairs of intersecting pulses; and/or feedback circuitry, or ASIC, adapted to provide a temporal offset control signal to an optical path length control means in the controllable delay means. Alternatively, the processor may include a general purpose computer programmed to perform one or more of these functions.

Figure 2:
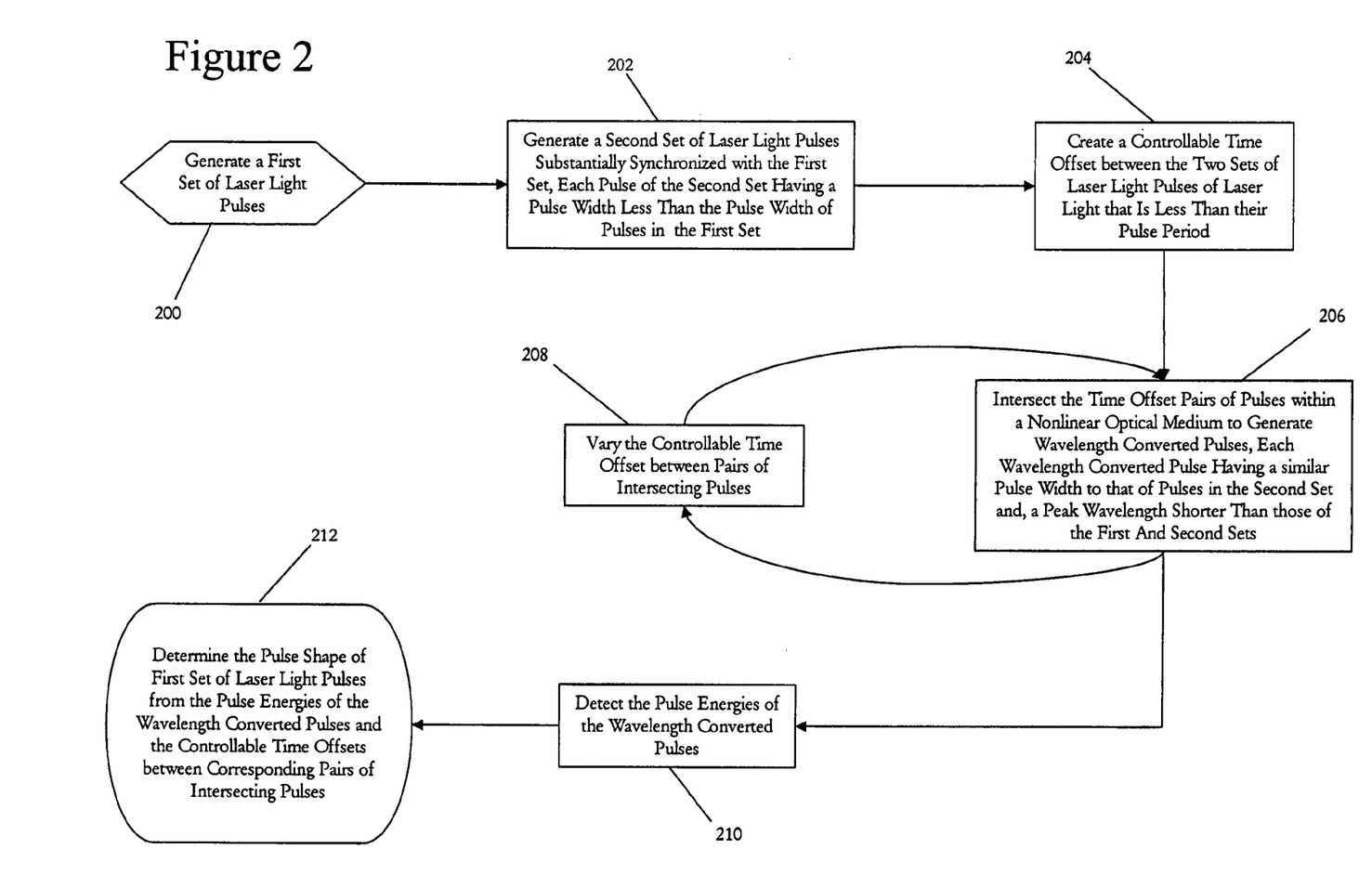
FIG. 2 is a flowchart illustrating an exemplary method for measuring the pulse shape of pulses of laser light according to the present invention.

FIG. 2 illustrates an exemplary method for measuring the pulse shape of a set of substantially similar pulses of laser light. This method may be performed using the exemplary system of FIG. 1, or another cross-correlation based laser pulse shape measurement system, such as the synchronized cavity system described above.

The set of substantially similar pulses of laser light (the first set) are generated, step 200. Each pulse of this first set of substantially similar pulses includes a first pulse width, a predetermined pulse period, and a predetermined peak wavelength. As describe above the exemplary method of FIG. 2 may be particularly desirable for measuring the pulse shape of pulses having a pulse width between about 100 fs and about 1 ns.

A second set of substantially similar pulses of laser light which are substantially synchronized with the first set of substantially similar pulses are generated, step 202. Each pulse of this second set desirably has: a second pulse width which is less than the first pulse width of the first set of laser pulses, desirably less than 1/50 of the first pulse width; a pulse period which is substantially equal to the predetermined pulse period of the first set; and a peak wavelength which is substantially equal to the predetermined peak wavelength of the first set.

Figure 3A:
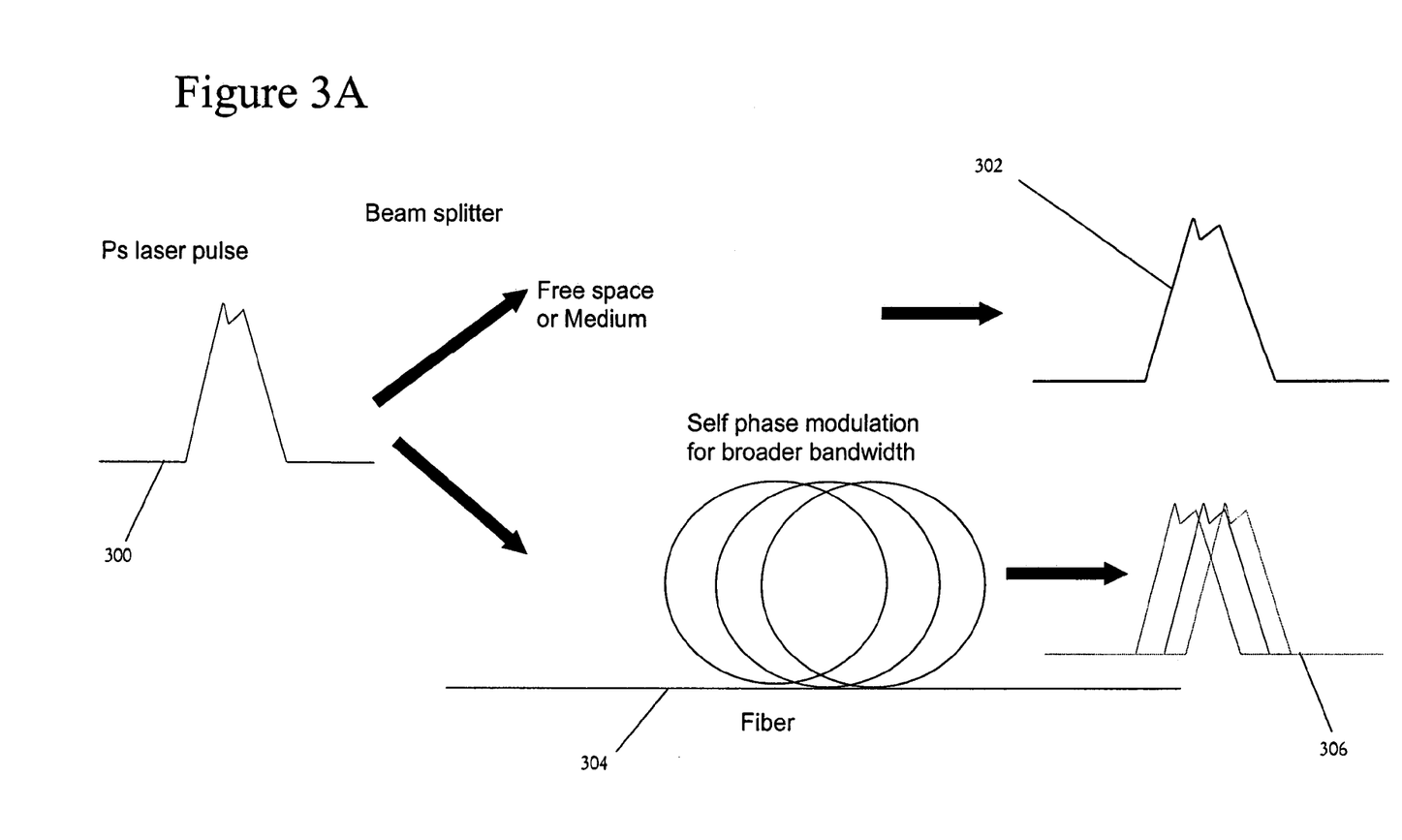
FIGS. 3A, 3B, and 3C are pulse diagrams illustrating the progress of pulses through an exemplary laser pulse shape measuring system, such as the exemplary laser pulse shape measuring system of FIG. 1, using the exemplary method of FIG. 2.
Figure 3B:
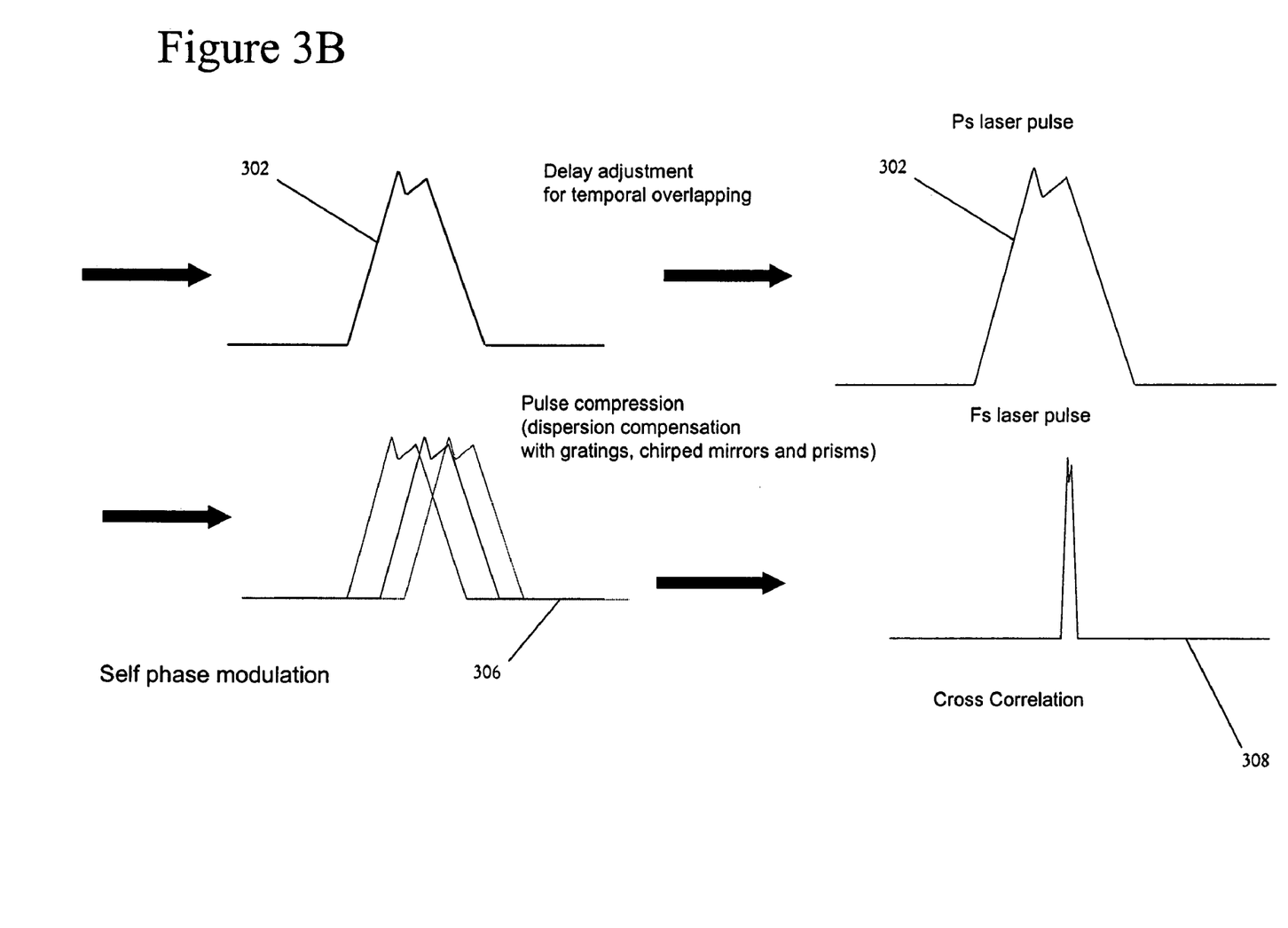

As described above the pulses in the second set may be generated by a synchronized second cavity or by compressing a portion of the pulses of the first set. FIGS. 3A and 3B schematically illustrate an exemplary pulse compression technique for an exemplary substantially transform limited pulse 300. Pulse 300 is split into two portions, a first portion, test pulse 302 (may which may travel through a constant medium or free space), is one of the first set of pulses and a second portion which is then compressed to become one of the second set of pulses. The second portion is coupled into fiber 304 to have its wavelength bandwidth broadened through self-phase modulation to generate broadened pulse 306. Broadened pulse 306 is then compressed by dispersion compensation to form probe pulse 308. As described above, if the original pulse is not transform limited the step of broadening the wavelength bandwidth of the second portion of the split pulse may be omitted.

Figure 3C:
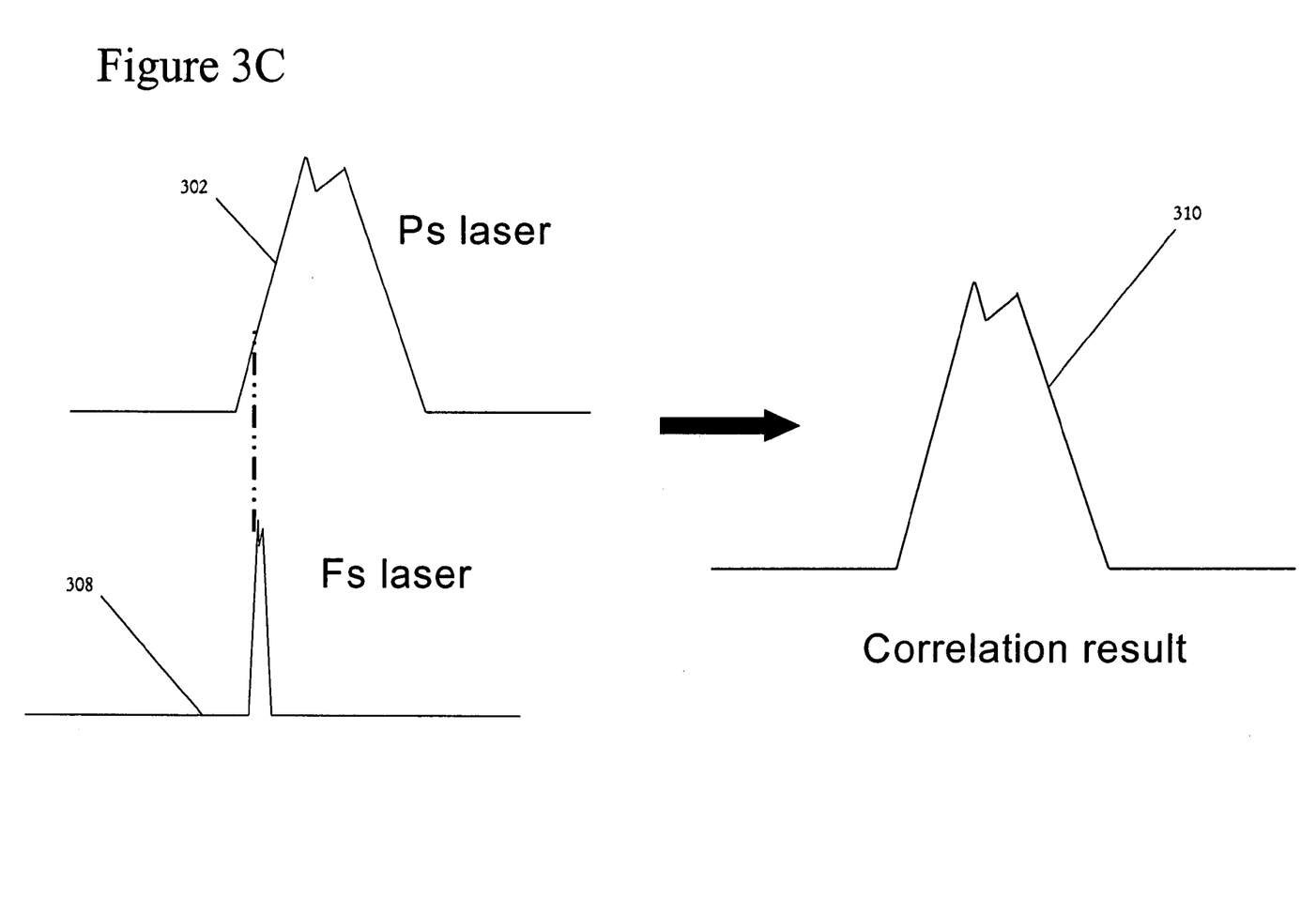

A controllable time offset is created between the first set of substantially similar pulses of laser light and the second set (i.e. the test pulses and the probe pulses), step 204. This controllable time offset, which is desirably less than the predetermined pulse period of the first set of laser pulses, may be created by controllably varying at least one of: the optical path length of at least one of the beam paths followed by the first and second set of pulses; or the time differential between the generation the first and second sets of substantially similar pulses of laser light in steps 200 and 202. The optical path length of one or both of the beam paths may be varied by varying the physical length of the beam path(s) using a means similar to movable retroreflector 112 in FIG. 1 and/or by varying the refractive index in a portion of the beam path(s) using an electrooptical cell. FIG. 3C illustrates an exemplary time offset between delayed test pulse 302 and compressed probe pulse 308.

Time offset pairs of pulses are directed so as to intersect within a nonlinear optical medium so that they may generate a set of wavelength converted pulses, step 206. These wavelength converted pulses may be generated by a harmonic generation or a degenerate four wave mixing process. Each of the wavelength converted pulses desirably has a pulse width substantially equal to the pulse width of the probe pulses in the second set (i.e. a significantly shorter pulse width than pulses of the first set) and a peak wavelength which is shorter than the predetermined peak wavelength of the first set of substantially similar pulses of laser light. In the case of wavelength converted pulses generated by a harmonic generation process, their peak wavelength which is an integral fraction (i.e. ½, ⅓, etc.) of the predetermined peak wavelength of the first set of substantially similar pulses. As described above with respect to FIG. 1, the wavelength converted pulses also have a pulse energy based on the pulse shape of the first set of pulses and the controllable time offset between the corresponding intersecting pair of pulses.

As the sequence of pairs of time offset pairs of pulses intersect within the nonlinear optical medium, the controllable time offsets between these pairs are varied, step 208. The controllable time offset between pairs of intersecting pulses may be desirably varied such that peaks of the second set of substantially similar pulses (the probe pulses) are coincident with a sequence of portions of pulses of the first set of substantially similar pulses (the test pulses) while the pulses are within the nonlinear optical medium. This effectively scans the peaks of the probe pulses over the pulse shape of the test pulses. Desirably, the controllable time offset may be varied in substantially equal temporal steps between consecutive pairs of pulses which are less than or equal to the pulse width of the probe pulses. The controllable time offset may also desirably be varied over a range that is greater than or equal to the first pulse width yet less than or equal to the predetermined pulse period. Such a selection of temporal steps and time offset range may allow for the generation of a set of wavelength converted pulses with pulse energies that may accurately describe the entire cross-correlation function of the pulses. FIG. 3C illustrates exemplary cross-correlation function 310, resulting from such a variation of temporal offsets.

The pulse energies of the wavelength converted pulses generated in step 206 as the controllable time offset between pairs of intersecting pulses is varied in step 208 are detected, step 210. It is noted that for a desirably smooth rendering of the cross-correlation function it may be desirable to take as many pulse energy measurement as the probe pulses are scanned across the pulse width of the test pulses as possible, but it has been found that about fifty measurements provide a reasonable smooth and accurate cross-correlation function measurement.

As described above with reference to FIG. 1, it may be desirable to filter the light emitted from the nonlinear optical medium to preferentially pass the plurality of wavelength converted pulses generated in step 206. This filtering may be performed by a high pass or band pass filter, or may result from selection of a photodetector with a desirable cutoff wavelength.

The pulse shape of first set of substantially similar pulses of laser light may be determined from the pulse energies of the plurality of wavelength converted pulses detected in step 206 and the controllable time offsets between corresponding pairs of intersecting pulses, step 212. These time offsets and pulse energies may be used as X and Y variables to create a cross-correlation function of the pulse sets. The pulse energies may be scaled based on the type of wavelength conversion used in step 206. If the probe pulses are narrow enough relative to the test pulses, this cross-correlation function may be a relatively accurate representation of the pulse shape of the test pulses. However, it may be desirable to perform calculations on the measured cross-correlation function to improve the accuracy with which the pulse shape of the test pulses is determined.

Although illustrated and described above with reference to certain specific embodiments, the present invention is nevertheless not intended to be limited to the details shown. Rather, various modifications may be made in the details within the scope and range of equivalents of the claims and without departing from the invention. In particular it is noted that, although the exemplary system of FIG. 1 is described in term of separate free-space optical components, an exemplary cross-correlation based laser pulse shape measuring system according to the present invention may be formed in an integrated optical fiber and/or planar waveguide system without departing from the invention.

What is claimed is:

1. A method for measuring a pulse shape of a first plurality of substantially similar pulses of laser light, the method comprising the steps of:
   a) generating the first plurality of substantially similar pulses of laser light, each pulse of the first plurality of substantially similar pulses of laser light including a first pulse width, a predetermined pulse period, and a predetermined peak wavelength;

b) generating a second plurality of substantially similar pulses of laser light substantially synchronized with the first plurality of substantially similar pulses of laser light, each pulse of the second plurality of substantially similar pulses of laser light including;
   a second pulse width less than the first pulse width of the first plurality of substantially similar pulses of laser light; and
   a peak wavelength substantially equal to the predetermined peak wavelength of the first plurality of substantially similar pulses of laser light;
c) creating a controllable time offset between the first plurality of substantially similar pulses of laser light and the second plurality of substantially similar pulses of laser light, the controllable time offset being less than the predetermined pulse period of the first plurality of substantially similar pulses of laser light;
d) intersecting time offset pairs of pulses within a nonlinear optical medium to generate a plurality of wavelength converted pulses, each wavelength converted pulse including;
   a converted pulse width substantially equal to the second pulse width of the second plurality of substantially similar pulses of laser light;
   a converted peak wavelength shorter than the predetermined peak wavelength of the first plurality of substantially similar pulses of laser light; and
   a pulse energy based on the pulse shape of the first plurality of substantially similar pulses of laser light and the controllable time offset between the corresponding intersecting pair of pulses;
e) detecting the pulse energies of the plurality of wavelength converted pulses generated in step (d) as the controllable time offset between pairs of intersecting pulses is varied;
f) determining the pulse shape of first plurality of substantially similar pulses of laser light from the pulse energies of the plurality of wavelength converted pulses detected in step (e) and the controllable time offsets between corresponding pairs of intersecting pulses; and
g) storing the pulse shape of the first plurality of substantially similar pulses of laser light.

2. A method according to claim 1, wherein the first pulse width of the first plurality of substantially similar pulses of laser light is longer than about 100 fs.

3. A method according to claim 1, wherein the first pulse width of the first plurality of substantially similar pulses of laser light is shorter than about 1 ns.

4. A method according to claim 1, wherein:
   the first plurality of substantially similar pulses of laser light further includes a first wavelength bandwidth; and
   the second plurality of substantially similar pulses of laser light further includes a second wavelength bandwidth broader than the first wavelength bandwidth of the first plurality of substantially similar pulses of laser light.

5. A method according to claim 4, wherein;
   the first pulse width of the first plurality of substantially similar pulses of laser light is substantially transform-limited; and
   the second pulse width of the second plurality of substantially similar pulses of laser light is substantially transform-limited.

6. A method according to claim 4, wherein step (b) includes the steps of;
   b1) splitting off a probe portion of the first plurality of substantially similar pulses of laser light;
   b2) broadening a bandwidth of the probe portion of the first plurality of substantially similar pulses of laser light from the first wavelength bandwidth to the second wavelength bandwidth by self-phase modulation; and
   b3) compensating dispersion within the self-phase modulated probe portion or the first plurality of substantially similar pulses of laser light to compress a pulse width of the self-phase modulated probe portion from the first pulse width to the second pulse width to generate the second plurality of substantially similar pulses of laser light.

7. A method according to claim 1, wherein step (b) includes the steps of:
   b1) splitting off a probe portion of the first plurality of substantially similar pulses of laser light; and
   b2) compressing a pulse width of the probe portion of the first plurality of substantially similar pulses of laser light from the first pulse width to the second pulse width to generate the second plurality of substantially similar pulses of laser light.

8. A method according to claim 1, wherein the second pulse width of the second plurality of substantially similar pulses of laser light is less than one fiftieth of the first pulse width of the first plurality of substantially similar pulses of laser light.

9. A method according to claim 1, wherein step (c) includes creating the controllable time offset by controllably varying at least one of:
   a length of a first beam path followed by the first plurality of substantially similar pulses of laser light to the nonlinear optical medium;
   a length of a second beam path followed by the second plurality of substantially similar pulses of laser light to the nonlinear optical medium;
   a refractive index of a portion of the first beam path;
   a refractive index of a portion of the second beam path; or
   a time differential between generating the first plurality of substantially similar pulses of laser light in step (a) and generating the second plurality of substantially similar pulses of laser light in step (b).

10. A method according to claim 1, wherein:
    step (d) includes generating the plurality of wavelength converted pulses by harmonic generation; and
    the converted peak wavelength is substantially equal to the predetermined peak wavelength of the first plurality of substantially similar pulses of laser light divided by an integer greater than 1.

11. A method according to claim 1, wherein step (d) includes generating the plurality of wavelength converted pulses by degenerate four-wave mixing.

12. A method according to claim 1:
    wherein the controllable time offset between pairs of intersecting pulses is varied during step (e) such that peaks of the second plurality of substantially similar pulses are coincident with a sequence of portions of pulses of the first plurality of substantially similar pulses within the nonlinear optical medium;
    thereby scanning the peaks of the second plurality of substantially similar pulses over the pulse shape of the first plurality of substantially similar pulses.

13. A method according to claim 1, wherein the controllable time offset between pairs of intersecting pulses is varied in substantially equal temporal steps.

14. A method according to claim 13, wherein the substantially equal temporal steps are less than or equal to the second pulse width.

15. A method according to claim 13, wherein the substantially equal temporal steps are less than or equal to about one fiftieth of the first pulse width.

16. A method according to claim 1 wherein the controllable time offset between pairs of intersecting pulses is varied during step (e) aver a range:
  greater than or equal to the first pulse width; and
  less than or equal to the predetermined pulse period.

17. A method according to claim 1, wherein the controllable time offset between the pairs of intersecting pulses is varied during step (e) such that the pulse energies of at least fifty wavelength converted pulses generated by the pairs of intersecting pulses having different controllable time offsets are detected.

18. A method according to claim 1, wherein step (e) includes the steps of:
  e1) filtering light emitted from the nonlinear optical medium to preferentially pass the plurality of wavelength converted pulses generated in step (d); and
  e2) detecting the pulse energies of the plurality of wavelength converted pulses filtered in step (e1).

19. A method according to claim 18, wherein the plurality of wavelength converted pulses are preferentially passed in step (e1) by one of:
  band-pass filtering the light emitted from the nonlinear optical medium; or
  high-pass filtering the light emitted from the nonlinear optical medium.

20. A method according to claim 1, wherein:
  the converted peak wavelength of the plurality of wavelength converted pulses is shorter than a shortest wavelength of the second plurality of substantially similar pulses; and
  step (e) includes using a photodetector with a cutoff wavelength shorter than the shortest wavelength of the second plurality of substantially similar pulses to detect the pulse energy of the plurality of wavelength converted pulses.

21. A laser pulse shape measuring system to measure a pulse shape of a plurality of pulses of laser light generated by a pulsed laser, each pulse of the plurality of pulses including a pulse width and a peak Wavelength, the laser pulse shape measuring system comprising:
  a beam splitter optically coupled to the pulsed laser to separate each pulse of the plurality of pulses into a test pulse and a probe pulse;
  a pulse width compression means optically coupled to the beam splitter to compress the pulse width of each probe pulse to a probe pulse width;
  a controllable delay means to control a time offset between each test pulse and a corresponding probe pulse to be less than a pulse period of the plurality of pulses, the controllable delay means aligned in at least one of a test beam path of the test pulses or a probe beam path of the probe pulses;
  a nonlinear optical medium arranged such that the test beam path and the probe beam path intersect within the nonlinear optical medium to generate wavelength converted pulses corresponding to intersecting pairs of test pulses and probe pulses, each wavelength converted pulse including;
    a converted pulse width substantially equal to the probe pulse width of the probe pulses;
    a converted peak wavelength shorter than the peak wavelength of the test pulses; and
    a pulse energy based on the pulse shape of the plurality of pulses generated by the pulsed laser and the time offsets between the corresponding pairs of intersecting pulses;
  a detector optically coupled to the nonlinear optical medium to dated the pulse energies of the wavelength converted pulses generated in the nonlinear optical medium; and
  a processor electrically coupled to the controllable delay means and the detector to determine the pulse shape of the plurality of pulses generated by the pulsed laser based on the pulse energies of the wavelength converted pulses and the time offsets between the corresponding pairs of intersecting pulses.

22. A laser pulse shape measuring system according to claim 21, wherein the pulse width of each pulse of plurality of pulses of laser light generated by the pulsed laser is longer than about 100 fs.

23. A laser pulse shape measuring system according to claim 21, wherein the pulse width of each pulse of plurality of pulses of laser light generated by the pulsed laser is shorter than about 1 ns.

24. A laser pulse shape measuring system according to claim 21, wherein a test pulse energy of each test pulse is greater than or equal to a probe pulse energy of a corresponding probe pulse.

25. A laser pulse shape measuring system according to claim 21, wherein the beam splitter includes at least one of a partially transmissive mirror, a diffractive optical element, or a mask with two holes.

26. A laser pulse shape measuring system according to claim 21, wherein the pulse width compression means includes a dispersion compensator to compensate for dispersion in the probe pulses such that the probe pulse width to which the probe pulses are compressed is substantially transform-limited.

27. A laser pulse shape measuring system according to claim 26, wherein the dispersion compensator includes at least one of a fiber dispersion compensator, a chirped grating based dispersion compensator, a chirped mirror based dispersion compensator, or a prism based dispersion compensator.

28. A laser pulse shape measuring system according to claim 26, wherein the pulse width of the test pulses is not substantially transform-limited.

29. A laser pulse shape measuring system according to claim 26, wherein:
  the pulse width of the test pulses is substantially transform-limited; and
  the pulse width compression means further includes a self-phase modulation medium optically coupled to the beam splitter to broaden a bandwidth of the probe.

30. A laser pulse shape measuring system according to claim 29, wherein the self-phase modulation medium includes at least one of:
  an optical fiber formed of a material a permittivity with a non-zero value for at least one order greater than 1;
  a bulk optical dielectric having a permittivity with a non-zero value for at least one order greater than 1; or
  a substantially transparent liquid having a permittivity with a non-zero value for at least one order greater than 1.

31. A laser pulse shape measuring system according to claim 21, wherein the probe pulse width is less than one fiftieth of the pulse width of the plurality of pulses of laser light generated by the pulsed laser.

32. A laser pulse shape measuring system according to claim 21, wherein the controllable delay means includes optics mounted on a linear translation stage, the optics being aligned in one of:
- the test beam path to controllably vary a length of the test beam path; or
- the probe beam path to controllably vary a length of the probe beam path.

33. A laser pulse shape measuring system according to claim 32, wherein the optics include at least one of a reflective optical element, a refractive optical element, or a diffractive optical element.

34. A laser pulse shape measuring system according to claim 32, wherein the linear translation stage includes at least one of a linear motor driven motion stage; a ball screw driven motion stage; a lead screw driven motion stage; a belt driven motion stage; or a piezoelectric motion stage.

35. A laser pulse shape measuring system according to claim 32, wherein the linear translation stage has:
- a maximum displacement of greater than or equal to about $1.5 \times 10^8$ m/s times the pulse width of the test pulses; and
- a positioning accuracy of less than or equal to about $1.5 \times 10^8$ m/s times the probe pulse width of the probe pulses.

36. A laser pulse shape measuring system according to claim 21, wherein:
- the controllable delay means includes an electrooptical cell adapted to vary a refractive index within the electrooptical cell, thereby varying an optical path length of an electrooptical cell path through the electrooptical cell; and
- the electrooptical cell is aligned such that one of the test beam path or the probe beam path includes the electrooptical cell path.

37. A laser pulse shape measuring system according to claim 36, wherein the optical path length of the electrooptical cell path has:
- a maximum path length change of greater than or equal to about $3.0 \times 10^8$ m/s times the pulse width of the test pulses; and
- a path length accuracy of less than or equal to about $3.0 \times 10^8$ m/s times the probe pulse width of the probe pulses.

38. A laser pulse shape measuring system according to claim 21, wherein:
- the nonlinear optical medium is a harmonic generating crystal; and
- the converted peak wavelength of the wavelength converted pulses is substantially equal to the peak wavelength of the plurality of pulses generated by the pulsed laser divided by an integer greater than 1.

39. A laser pulse shape measuring system according to claim 21, wherein:
- the converted peak wavelength of the wavelength converted pulses is shorter than a shortest wavelength of the probe pulses; and
- the detector is a photodetector with a cutoff wavelength shorter than the shortest wavelength of the probe pulses to detect the pulse energy of the wavelength converted pulses.

40. A laser pulse shape measuring system according to claim 21, wherein the processor includes at least one of:
- pulse shape analysis circuitry adapted to determine the pulse shape of the plurality of pulses generated by the pulsed laser;
- an application specific integrated circuit adapted to determine the pulse shape of the plurality of pulses generated by the pulsed laser; or
- a general purpose computer programmed to determine the pulse shape of the plurality of pulses generated by the pulsed laser.

41. A laser pulse shape measuring system according to claim 40, wherein:
- the controllable delay means includes an optical path length sensor; and
- the processor is electrically coupled to the optical path length sensor and further includes at least one of;
- temporal offset calculation circuitry responsive to an optical path length signal from the optical path length sensor;
- an application specific integrated circuit adapted to calculate the time offsets between the corresponding pairs of intersecting pulses based on the optical path length signal from the optical path length sensor; or
- a general purpose computer programmed to calculate the time offsets between the corresponding pairs of intersecting pulses based on the optical path length signal from the optical path length sensor.

42. A laser pulse shape measuring system according to claim 41, wherein:
- the controllable delay means further includes optical path length control means; and
- the processor is electrically coupled to the optical path length control means and further includes at least one of;
- feedback circuitry adapted to provide a temporal offset control signal to the optical path length control means;
- an application specific integrated circuit adapted to provide a temporal offset control signal to the optical path length control means; or
- a general purpose computer programmed to provide a temporal offset control signal to the optical path length control means.

43. A laser pulse shape measuring system according to claim 21, further comprising a optical filter aligned between the nonlinear optical medium and the detector to preferentially pass wavelength converted pulses and substantially block the test pulses and the probe pulses.

44. A laser pulse shape measuring system according to claim 43, wherein the optical filter is one of a dielectric band-pass filter or a dielectric high-pass filter.

* * * * *